(12) United States Patent
Lee

(10) Patent No.: US 10,480,344 B2
(45) Date of Patent: Nov. 19, 2019

(54) VALVE MODULE, AND STEAM TURBINE AND POWER GENERATION SYSTEM INCLUDING THE SAME

(71) Applicant: DOOSAN HEAVY INDUSTRIES & CONSTRUCTION CO., LTD., Changwon-si, Gyeongsangnam-do (KR)

(72) Inventor: Hyunchul Lee, Changwon-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 15 days.

(21) Appl. No.: 15/950,196

(22) Filed: Apr. 11, 2018

(65) Prior Publication Data

US 2018/0334919 A1 Nov. 22, 2018

(30) Foreign Application Priority Data

May 16, 2017 (KR) .................. 10-2017-0060335

(51) Int. Cl.
*F01D 17/14* (2006.01)
*F16K 3/314* (2006.01)
(Continued)

(52) U.S. Cl.
CPC ........... *F01D 17/145* (2013.01); *F01D 21/00* (2013.01); *F16K 1/443* (2013.01); *F16K 3/0227* (2013.01);
(Continued)

(58) Field of Classification Search
CPC .......... F01D 17/145; F16K 1/44; F16K 1/443; F16K 3/0227; F16K 3/0236; F16K 3/0281; F16K 3/314; F16K 31/56; F16K 1/08; F16K 39/024; F05D 2220/31; F01K 13/00; F01K 13/02

See application file for complete search history.

(56) References Cited

U.S. PATENT DOCUMENTS 3,809,126 A * 5/1974 Oberle .................. F01D 17/145
137/630.14
4,092,214 A 5/1978 Schabert et al.
(Continued)

FOREIGN PATENT DOCUMENTS

DE 102011107956 A1 1/2013
DE 102011116295 A1 4/2013
(Continued)

*Primary Examiner* — Mark A Laurenzi
*Assistant Examiner* — Xiaoting Hu
(74) *Attorney, Agent, or Firm* — INVENSTONE Patent, LLC

(57) ABSTRACT

A valve module is provided in a steam turbine and a power generation system. The valve module includes a stop valve, a control valve, and a case. The stop valve includes a stem to reciprocate rectilinearly between a first position and a second position, a stop valve disc mounted to an upper portion of the stem, to pass fluid when the stem is in the first position and to block fluid flow when the stem is in the second position, and a sealing member surrounding the stem and configured to prevent exposure of the stem when the stop valve disc is located at the first position. The valve module is capable of protecting a stem from high-pressure fluid that is introduced to the stop valve.

20 Claims, 7 Drawing Sheets

(51) Int. Cl.
*F16K 31/56* (2006.01)
*F16K 1/44* (2006.01)
*F16K 3/02* (2006.01)
*F22B 37/02* (2006.01)
*F01D 21/00* (2006.01)

(52) U.S. Cl.
CPC ............ *F16K 3/0281* (2013.01); *F16K 3/314* (2013.01); *F16K 31/56* (2013.01); *F22B 37/02* (2013.01); *F05D 2220/31* (2013.01)

(56) References Cited

U.S. PATENT DOCUMENTS

| | | | |
|---|---|---|---|
| 4,114,651 A * | 9/1978 | Oberle | F01D 17/145 137/613 |
| 4,121,617 A * | 10/1978 | Masek | F01D 17/145 137/613 |
| 4,238,290 A | 12/1980 | Hoffmann et al. | |
| 4,269,227 A * | 5/1981 | Araki | F16K 1/44 137/630.14 |
| 5,018,356 A | 5/1991 | Silvestri, Jr. et al. | |
| 2012/0286524 A1* | 11/2012 | Bronicki | F01K 13/02 290/40 B |

FOREIGN PATENT DOCUMENTS

| | | |
|---|---|---|
| EP | 1635097 A1 | 3/2006 |
| JP | 2003027904 A | 1/2003 |
| JP | 2007192168 A | 8/2007 |
| KR | 20060067897 A | 6/2006 |
| KR | 101431133 B1 | 8/2014 |
| KR | 20140144140 A | 12/2014 |
| KR | 101682016 B1 | 12/2016 |
| KR | 101695938 B1 | 1/2017 |

\* cited by examiner

VALVE MODULE, AND STEAM TURBINE AND POWER GENERATION SYSTEM INCLUDING THE SAME

CROSS-REFERENCE TO RELATED APPLICATIONS

This application claims priority to and the benefit of Korean Patent Application No. 10-2017-0060335 filed in the Korean Intellectual Property Office on May 16, 2017, the entire contents of which are incorporated herein by reference.

BACKGROUND OF THE INVENTION

Field of the Invention

The present invention relates to a valve module including a plurality of valve discs and to a steam turbine and a power generation system including the same.

Description of the Related Art

A steam turbine plant includes a steam generator, which generates high-pressure steam by heating a working fluid to a high temperature in a boiler. The steam pressure generated in the steam generator rotates a turbine, and the rotational force of the turbine rotates an electric generator, thereby producing electric power.

In general, a steam turbine plant includes a boiler, which generates high-temperature and high-pressure steam using a heat source such as thermal energy or nuclear energy, and a turbine, which generates drive force for driving an electric generator using steam supplied from the boiler. In order to improve the operational efficiency, the steam turbine plant includes multiple turbines whose operating pressures are different from one another, namely, a high-pressure turbine, a medium-pressure turbine, and a low-pressure turbine. The amount of steam generated in the steam generator and supplied to the turbine via a control valve is controlled depending on the pressure of the steam. At this time, the output of the turbine is controlled according to the opening degree of the control valve.

Such a control valve is typically large and is manufactured in accordance with other large-scale power plant equipment. In order to optimally design a control valve, and more specifically to determine in advance the valve's flow rate characteristics according to its opening degree, performance testing is carried out while the control valve is installed in a common wind tunnel, whereupon the inlet pressure and the outlet pressure of the control valve are compared with each other.

SUMMARY OF THE INVENTION

Therefore, the present invention has been made in view of the above problems, and it is an object of the present invention to provide a valve module capable of protecting a stem from high-pressure fluid that is introduced to a stop valve, and a steam turbine and a power generation system including the same.

In accordance with an aspect of the present invention, the above and other objects can be accomplished by the provision of a valve module including a stop valve, a control valve, and a case. The stop valve may include a stem configured to reciprocate rectilinearly between a first position and a second position, a stop valve disc mounted to an upper portion of the stem and configured to pass fluid when the stem is in the first position and to block fluid flow when the stem is in the second position, and a sealing member surrounding the stem and configured to prevent exposure of the stem when the stop valve disc is located at the first position. The control valve may be disposed above the stop valve and configured to control an amount of introduced fluid. The case may include a flow space for accommodating the stop valve and the control valve, an inlet port through which fluid is introduced to the flow space, and an outlet port through which fluid in the flow space is discharged.

The stop valve disc may be disposed, in an upward location, according to vertical movement of the stem into the first position. The stop valve disc may be disposed, in a downward location, according to vertical movement of the stem into the second position.

The sealing member may be formed of a material having greater toughness than a material of the stem.

The stop valve disc has a bottom side and a receiving recess may be formed in the bottom side to receive the sealing member.

The sealing member may include a protruding portion extending upward and flaring outward to meet an inward lip formed on an inner circumference of the bottom side of the stop valve disc, when the stem is in the first position.

The stop valve disc may have an insertion recess formed in the bottom side to receive the protruding portion when the stem is in the second position.

The inward lip of the stop valve disc may extend from the inner circumference at an inclination angle, and the protruding portion may be formed to have the same inclination angle.

When the stem is in the first position, the protruding portion of the sealing member and the inward lip of the stop valve disc may engage with each other to prevent fluid from entering the receiving recess through the bottom side of the stop valve disc.

The sealing member may include a guide portion formed at an upper end of the sealing member, and the guide portion may have a concavely curved shape in order to guide fluid in a downward direction when the stop valve disc is located at the first position. Below the guide portion, the sealing member may have an outer diameter that gradually increases in the downward direction.

The case may include a valve seat on which the stop valve disc is seated in order to block a flow passage of fluid. The valve seat may include a convex portion facing the stop valve and an inclined surface formed on the convex portion and inclined downwardly in order to guide fluid introduced into a fluid space formed between the valve seat and the stop valve disc. The inclined surface may be inclined at an angle ranging from 40° to 50° with respect to a horizontal line that extends from an upper end of the valve seat.

The flow space may have an elliptical shape.

The control valve may include a rod configured to reciprocate rectilinearly in a vertical direction; and a control valve disc mounted to a lower portion of the rod and configured to control an amount of introduced fluid according to movement of the rod.

The control valve disc may have a bottom side and a receiving recess in which an upper end portion of the stop valve disc and an upper end portion of the stem are received through the bottom side.

The control valve disc may have a lower portion for guiding introduced fluid in a downward direction and an outer diameter of the lower portion that gradually decreases in the downward direction.

In accordance with a further aspect of the present invention, there is provided a steam turbine including a turbine that may include a rotor equipped with a plurality of turbine blades and a turbine housing for accommodating the rotor, the turbine housing having a fluid inlet and a fluid outlet; and the above valve module mounted to the turbine housing.

In accordance with a further aspect of the present invention, there is provided a power generation system comprising a boiler configured to heat fluid to a high temperature; a supply pipe connected to the boiler and configured to transfer fluid; and a steam turbine configured to be rotated by fluid supplied thereto via the supply pipe so as to generate drive force. The steam turbine may include a turbine and the above valve module mounted to the turbine.

The power generation system may further include a fluid circulation line configured to circulate fluid discharged from the steam turbine. The fluid circulation line may include a first circulation line configured to allow fluid discharged from the steam turbine to undergo heat exchange in a recuperator; a second circulation line configured to allow fluid that has undergone heat exchange in the recuperator to be condensed in an air-cooled condenser; a third circulation line configured to allow fluid condensed in the air-cooled condenser to be compressed by a main pump; a fourth circulation line configured to allow fluid compressed by the main pump to undergo heat exchange in the recuperator; and a fifth circulation line configured to allow fluid that has undergone heat exchange in the recuperator to be reheated in the boiler.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
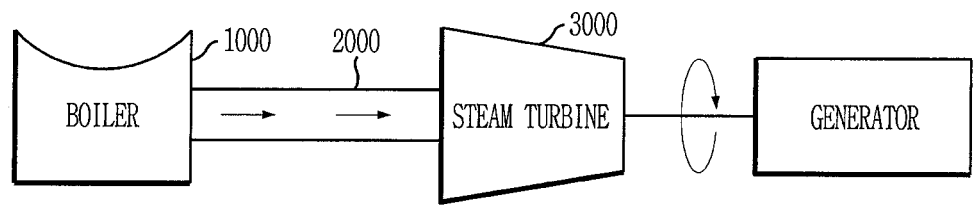
FIG. 1 is conceptual diagram illustrating a power generation system using a steam turbine according to an embodiment of the present invention.

Since embodiments of the present invention can be variously modified in many different forms, reference will now be made in detail to specific embodiments of the present invention. It is to be understood that the present description is not intended to limit the present invention to those specific embodiments and that the present invention is intended to cover not only the specific embodiments but also various alternatives, modifications, equivalents and other embodiments that may be included within the spirit and scope of the present invention as defined by the appended claims.

The terminology used herein is for the purpose of describing particular embodiments only and is not intended to be limiting. As used herein, the singular forms are intended to include the plural forms as well, unless the context clearly indicates otherwise. It will be further understood that the terms "comprise", "include", "have", etc., when used in this specification, specify the presence of stated features, integers, steps, operations, elements, components, and/or combinations thereof, but do not preclude the presence or addition of one or more other features, integers, steps, operations, elements, components, and/or combinations thereof.

Hereinafter, preferred embodiments of the present invention will be described in detail with reference to the accompanying drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear. In the drawings, elements may be exaggerated in size, omitted or schematically illustrated for convenience in description and clarity.

Referring to FIG. 1, the power generation system using the steam turbine according to the embodiment of the present invention includes a boiler 1000, a supply pipe 2000, and a steam turbine 3000. The boiler 1000 serves to heat fluid to a high temperature. The supply pipe 2000 receives the high-pressure fluid from the boiler 1000 and transfers the high-pressure fluid to the steam turbine 3000. The steam turbine 3000 is rotated by the high-pressure fluid, which is supplied through the supply pipe 2000, and generates power.

Figure 2:
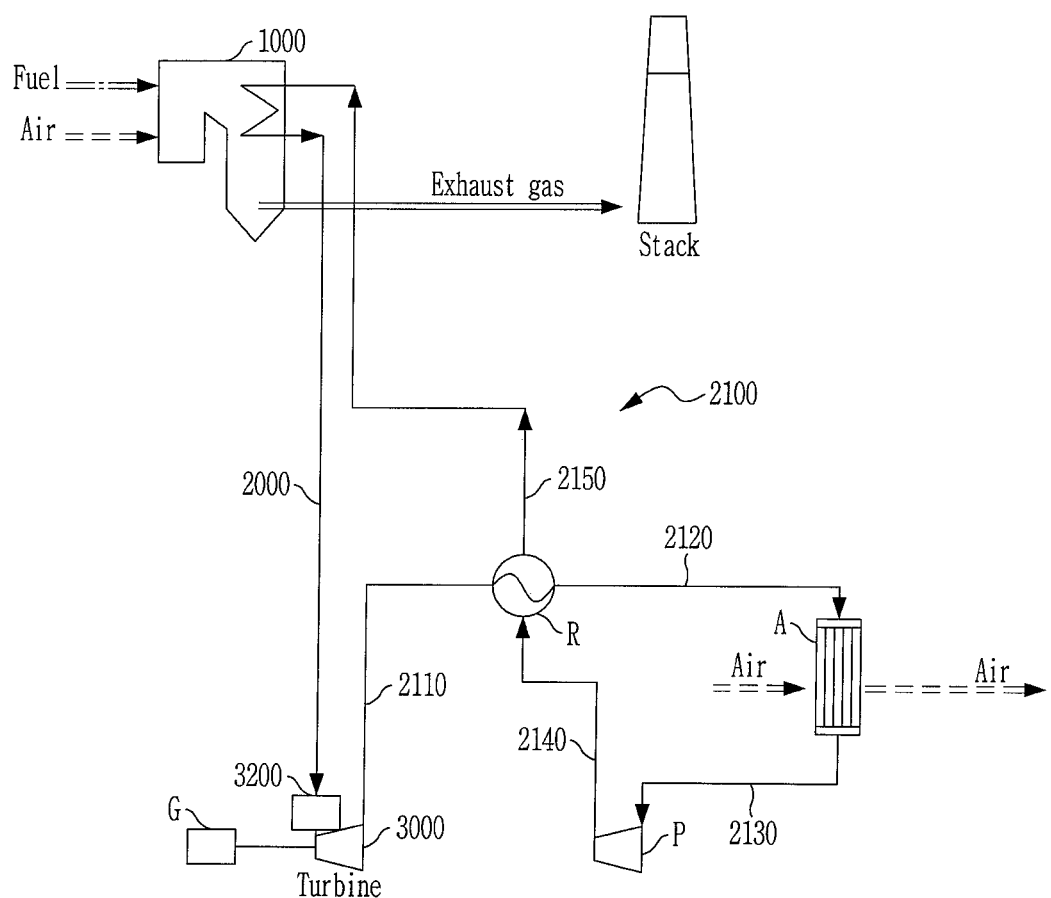
FIG. 2 is a system diagram of the power generation system of FIG. 1.

Referring to FIG. 2, the power generation system may further include a fluid circulation line 2100.

The supply pipe 2000 serves to transfer fluid, whose temperature has been raised to about 600° C. and pressure has been raised to about 240 bar by the boiler 1000, which generates combustion heat by forcibly receiving fuel as well as combustion air sucked from the outside by a forced draft fan (not shown). The fluid transferred through the supply pipe 2000 is introduced into a valve module 3200 mounted on the steam turbine 3000. The valve module 3200 selectively passes (allows) or blocks (cuts off) the flow of fluid, specifically the flow of fluid to be introduced to the steam turbine 3000, and controls the pressure of the introduced fluid. The steam turbine 3000 is operated by the fluid that has passed through the valve module 3200. The exhaust gas discharged from the boiler 1000 is discharged from the system via a stack. The fluid may be at least one of water, carbon dioxide ($CO_2$), or supercritical carbon dioxide ($SCO_2$). However, the present invention is not limited thereto.

The fluid circulation line 2100 includes a first circulation line 2110, a second circulation line 2120, a third circulation line 2130, a fourth circulation line 2140, and a fifth circulation line 2150.

The fluid discharged from the steam turbine 3000 is transferred to a recuperator R through the first circulation line 2110. The fluid discharged from the steam turbine 3000 has a temperature of about 450° C. and a pressure of about 80 bar. The fluid undergoes heat exchange in the recuperator R, and the temperature of the fluid drops to about 50° C.

The fluid that has undergone the heat exchange in the recuperator R is transferred to an air-cooled condenser A through the second circulation line 2120. The fluid that passes through the air-cooled condenser A is cooled to a temperature of about 20° C. by an air-cooling fan (not shown) disposed at a front side of the air-cooled condenser A.

The fluid condensed in the air-cooled condenser A is transferred to a main pump P through the third circulation line 2130. The fluid transferred to the main pump P is compressed by the main pump P, and the pressure of the fluid rises.

The fluid compressed by the main pump P is transferred to the recuperator R through the fourth circulation line 2140. The fluid undergoes heat exchange in the recuperator R, and the temperature of the fluid rises.

The fluid that has undergone the heat exchange in the recuperator R is transferred to the boiler 1000 through the fifth circulation line 2150. The fluid is reheated in the boiler 1000, where its temperature and pressure are brought back up to about 600° C. and 240 bar, respectively.

Figure 3:
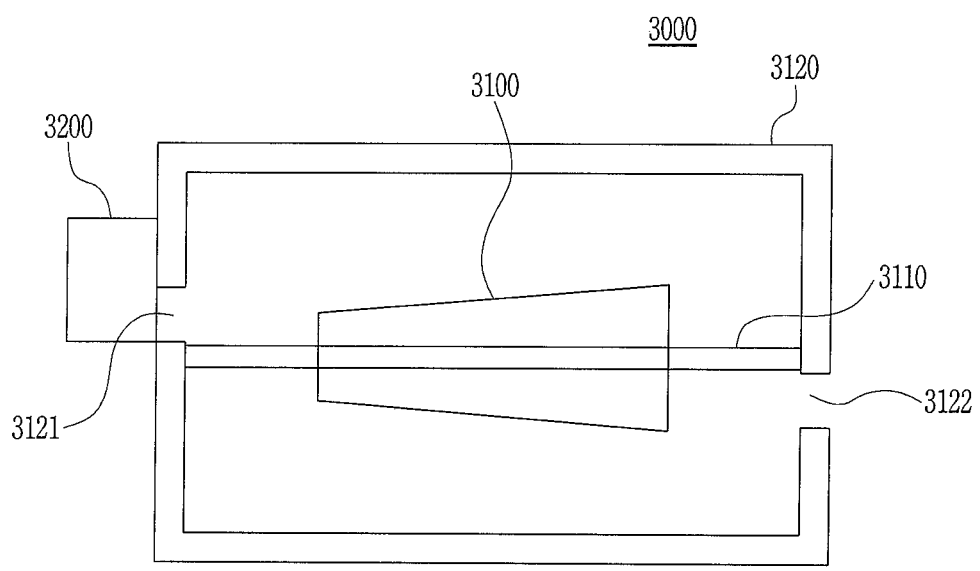
FIG. 3 is a diagram illustrating the operational concept of the valve module and the steam turbine according to the embodiment of the present invention.

Referring to FIG. 3, the steam turbine 3000 according to the embodiment of the present invention includes a turbine 3100 and the valve module 3200. The turbine 3100 includes a rotor 3110 and a turbine housing 3120. The rotor 3110 is equipped with a plurality of turbine blades (not shown), which are configured to be rotated by a high-pressure fluid. The turbine blades are arranged radially inside the turbine housing 3120, and serve to convert the pressure of the fluid, which is introduced into the turbine housing 3120, into rotational motion of the rotor 3110. The turbine housing 3120 accommodates the rotor 3110 and includes a fluid inlet 3121, through which a high-pressure fluid is introduced to the turbine housing 3120, and a fluid outlet 3122, through which the fluid that has passed by the turbine blades is discharged from the turbine housing 3120. The valve module 3200 is mounted to the fluid inlet 3121 of the turbine housing 3120 and serves to selectively pass or block the flow of fluid and to control the amount (flow rate) of fluid that is introduced to the turbine housing 3120.

Figure 4:
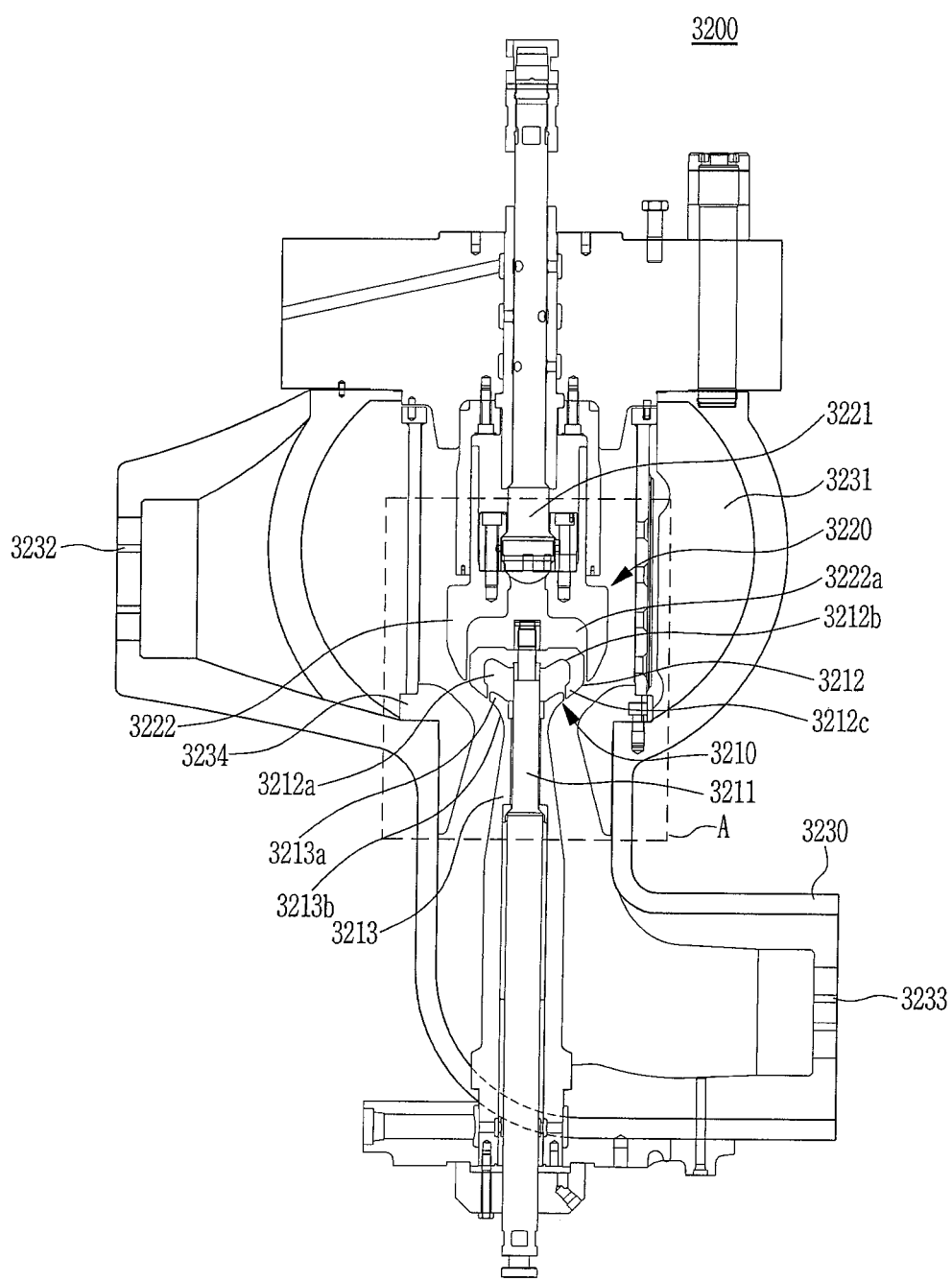
FIG. 4 is a cutaway view of a valve module according to the embodiment of the present invention.
Figure 5:
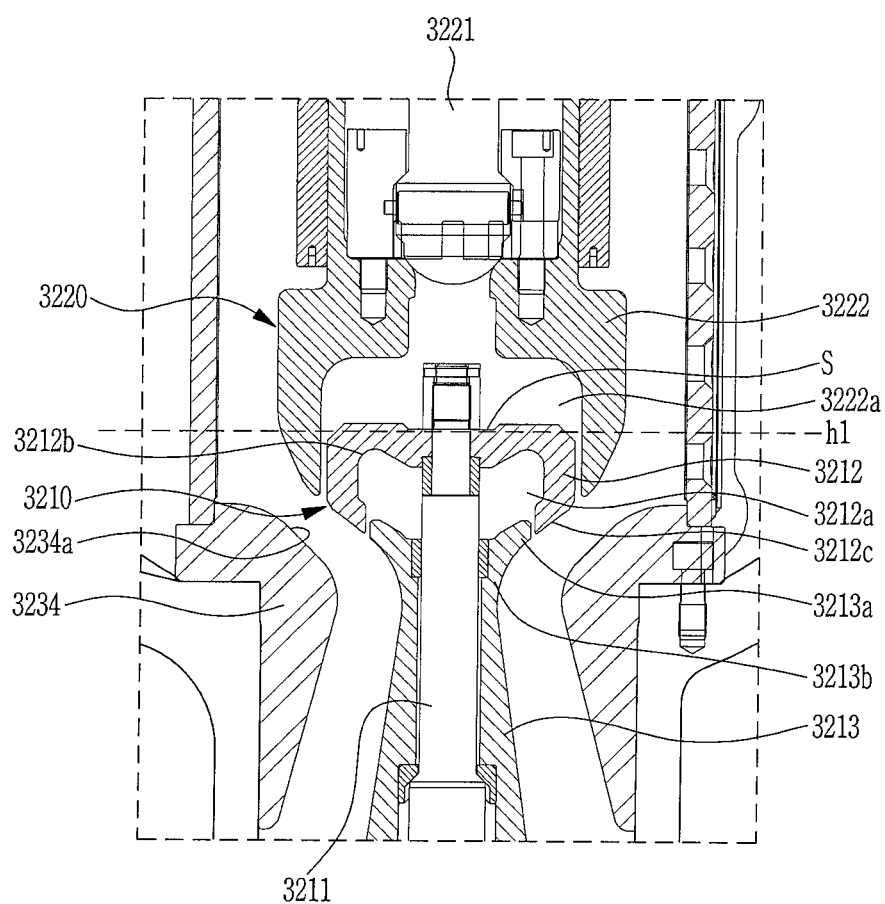
FIG. 5 is an enlarged view of portion "A" in FIG. 4, showing the valve module in a first-position state.
Figure 6:
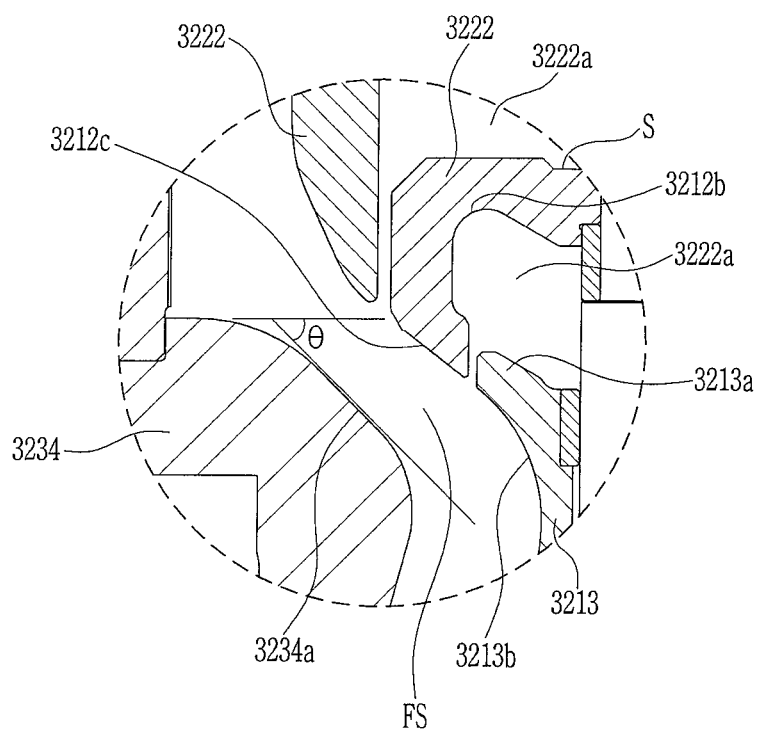
FIG. 6 is a view for explaining an inflow angle of fluid introduced to a fluid space formed within the valve module according to the embodiment of the present invention.
Figure 7:
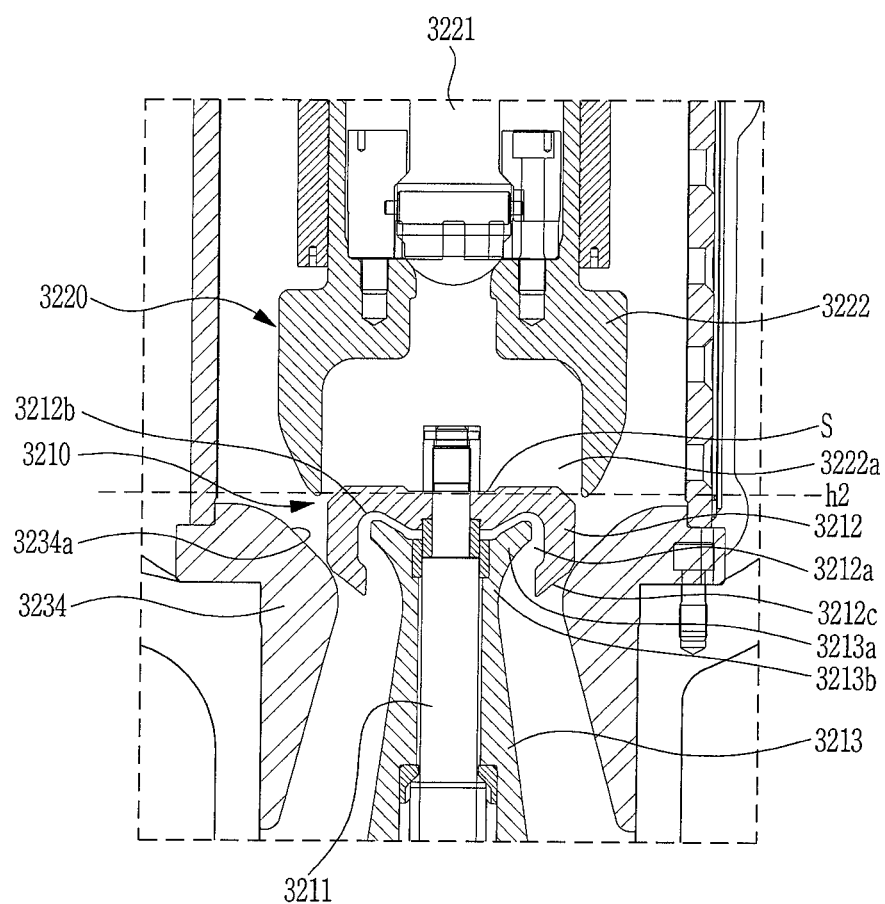
FIG. 7 is an enlarged view of portion "A" in FIG. 4, showing the valve module in a second-position state.

FIG. 4 illustrates the interior of a valve module according to the embodiment of the present invention. FIGS. 5 and 7 each show portion "A" of FIG. 4, when the valve module is in the first- and second-position states, respectively. FIG. 6 is for explaining an inflow angle of fluid introduced to a fluid space formed within the valve module according to the embodiment of the present invention.

As illustrated in FIGS. 4 to 7, the valve module 3200 according to the embodiment of the present invention includes a stop valve 3210, a control valve 3220, and a case 3230.

The stop valve 3210 includes a stem 3211, a stop valve disc 3212, and a sealing member 3213. The stem 3211, which has one end disposed so as to penetrate a lower portion of the case 3230, is arranged vertically to reciprocate rectilinearly between a first position h1 and a second position h2. The stop valve disc 3212 is mounted to an upper portion, and specifically the upper end, of the rectilinearly reciprocating stem 3211 and essentially travels between the first and second positions h1 and h2.

Thus, according to an operation of the valve module 3200, and specifically, the reciprocating operation of the stem 3211, the stem 3211 may be in the first position h1 or the second position h2, or more correctly, in a state consistent with the first position h1 or the second position h2. Since the stop valve disc 3212 is mounted to the stem 3211, the location of the stop valve disc 3212 may be described as being at the first position h1 or at the second position h2. Therefore, according to the present invention, the stop valve disc 3212 is configured to pass fluid when the stem 3211 is in the first position h1 and to block fluid flow when the stem 3211 is in the second position h2. In other words, the stop valve disc is vertically disposed upward according to movement of the stem 3211 into the first position h1 and is vertically disposed downward according to movement of the stem 3211 into the second position h2.

When the stop valve disc 3212 is located at the first position h1 due to a vertical movement of the stem 3211, the introduction of fluid into the case 3230 is allowed, as the disposition of the stop valve disc 3212 at the first position h1 allows fluid to pass into the case 3230. When the stop valve disc 3212 is located at the second position h2 due to a vertical movement of the stem 3211, the introduction of fluid into the case 3230 is cut off, as the disposition of the stop valve disc 3212 at the second position h2 blocks fluid flow into the case 3230.

The sealing member 3213 surrounds the stem 3211 so as to prevent exposure of the stem 3211 when the stop valve disc 3212 is located at the first position h1. The sealing member 3213 includes a guide portion 3213b, which has a concavely curved shape. The sealing member 3213 protects the stem 3211 from foreign substances included in the fluid that is introduced into the case 3230.

In order to assure smooth reciprocating movement of the stem 3211, which is surrounded by the sealing member 3213, and to prevent abrasion between the stem 3211 and the sealing member 3213, nitriding treatment may be performed on the surface of the stem 3211. In addition, the sealing member 3213 may be formed of a material having greater toughness than the material of the stem 3211. In order to prevent foreign substances from entering a gap between the stem 3211 and the sealing member 3213, an additional sealing member (not shown) may be provided between the outer circumferential surface of the upper end of the stem 3211 and the inner circumferential surface of the upper end of the sealing member 3213.

The control valve 3220 is disposed above the stop valve 3210. The control valve 3220 includes a rod 3221 and a control valve disc 3222. The rod 3221, which has one end disposed so as to penetrate an upper portion of the case 3230, is arranged vertically and reciprocates rectilinearly. The control valve disc 3222 is mounted to a lower portion, and specifically the lower end, of the rod 3221 in order to control the amount of fluid that is introduced according to the reciprocating movement of the rod 3221. The control valve disc 3222 has an open bottom side in which a receiving recess 3222a is formed. Upon upward movement of the stem 3211 in the vertical direction, the receiving recess 3222a receives an upper end portion of the stop valve disc 3212 and an upper end portion of the stem 3211 through the open bottom side of the control valve disc 3222.

The case 3230 includes a flow space 3231, an inlet port 3232, and an outlet port 3233. The flow space 3231 accommodates the stop valve 3210 and the control valve 3220 therein. The flow space 3231 may have an elliptical shape, which exhibits low pressure loss. The inlet port 3232 is connected with the supply pipe 2000, through which high-pressure fluid is introduced into the case 3230. The outlet port 3233 serves to discharge the fluid to the fluid inlet 3121 of the turbine housing 3120. Inside the case 3230 is provided a valve seat 3234 on which the stop valve disc 3212 is seated in order to block the flow passage of the fluid that is introduced into the case 3230 through the inlet port 3232.

The control valve disc 3222 has a lower portion for guiding introduced fluid in a downward direction. The outer diameter of the lower portion is gradually decreased in the downward direction in order to increase the distance between the outer circumferential surface of the control valve disc 3222 and the valve seat 3234, thereby assuring the smooth flow of fluid and securely guiding the fluid to an inclined surface 3234a of the valve seat 3234.

The stop valve disc 3212 has an open bottom side in which a receiving recess 3212a is formed. Upon upward movement of the stem 3211 in the vertical direction, the receiving recess 3212a receives an upper end portion of the sealing member 3213 through the open bottom side of the stop valve disc 3212.

In order to seal off (close) the open bottom side of the stop valve disc 3212 when the stop valve disc 3212 is located at the first position h1, the sealing member 3213 may include a protruding portion 3213a, which extends upward and flares outward, at an incline, from the upper end of the sealing member 3213. The protruding portion 3213a engages with the stop valve disc 3212, thereby preventing the fluid from entering the receiving recess 3212a through the open bottom side of the stop valve disc 3212. The stop valve disc 3212 may further have an insertion recess 3212b formed in the bottom side of the stop valve disc 3212, the insertion recess 3212b forming an inner surface of the bottom side, and the protruding portion 3213a is inserted into the insertion recess 3212b when the stop valve disc 3212 is located at the second position h2. That is, when the stem 3211 is moved into the second position h2, the insertion recess 3212b of the stop valve disc 3212 receives the protruding portion 3213a of the sealing member 3213, which surrounds the stem 3211 below the stop valve disc 3212.

The stop valve disc 3212 may further include an inward lip 3212c, which may engage with the protruding portion 3213a to form a seal. The inward lip 3212c extends, at an inclination angle, from an inner circumference of the bottom side of the stop valve disc 3212. The protruding portion 3213a is formed have the same inclination angle. That is, the protruding portion 3213a of the sealing member 3213 extends upward and flares outward to meet the inward lip 3212c, when the stem 3211 is in the first position h1. In other words, when the stop valve disc 3212 is located at the first position h1, an inclined surface of the inward lip 3212c extends inwardly to align with an inclined surface of the protruding portion 3213a, which extends outwardly at the same inclination angle. Therefore, since the inclined surfaces are outer surfaces facing the flow space 3231 and are aligned with each other, the fluid introduced into a specific fluid space FS between the valve seat 3234 and the stop valve disc 3212 may flow more smoothly. Here, the specific fluid space FS is formed within the valve module 3200, between the valve seat 3234 and the stop valve disc 3212, when stop valve disc 3212 is located at the first position.

The stop valve disc 3212 may have a flat-bottomed recess S, which is formed in the center of the outer top surface of the stop valve disc 3212 in order to allow the stop valve disc 3212 to be coupled to the stem 3211 via a nut (not shown).

The sealing member 3213 may include a guide portion 3213b, which has a concavely curved shape. The guide portion 3213b is formed at the lower side of the protruding portion 3213a, which is formed at the upper end of the sealing member 3213. When the stop valve disc 3212 is located at the first position h1, the fluid introduced into the specific fluid space FS is guided toward the outlet port 3233 of the case 3230 at a high speed along the curved surface of the sealing member 3213. The guide portion 3213b prevents the fluid from directly striking the sealing member 3213, thereby preventing the sealing member 3213 from being damaged by being struck by foreign substances included in the fluid and preventing high-cycle fatigue of the stem 3211 attributable to vibration that is applied to the stem 3211 due to being directly struck by the fluid.

The sealing member 3213 may be formed such that, below the guide portion 3213b, the outer diameter of the sealing member 3213 gradually increases in the downward direction. Through this configuration of the sealing member 3213, when the fluid introduced into the specific fluid space FS flows along the guide portion 3213b, the flow of fluid is expanded radially in the downward direction, and consequently, the fluid is smoothly discharged through the outlet port 3233 of the case 3230.

As illustrated in FIG. 6, the valve seat 3234 may be formed to be convex toward the stop valve 3210 in order to assure the smooth flow of the fluid. That is, the valve seat 3234 has a convex portion facing the stop valve 3210. The valve seat 3234 may include an inclined surface 3234a, which is formed in a central portion of the convex portion of the valve seat 3234 and inclined downwardly in order to guide the fluid toward the guide portion 3213b of the sealing member 3213. The inclined surface 3234a may be inclined at an angle θ ranging from 40° to 50°, specifically at an angle θ of 45°, with respect to the horizontal line that extends from the upper end of the valve seat 3234. An angle θ of less than 40° tends to impede the flow of the introduced fluid (i.e., produces a decreased flow rate), and thus the fluid cannot flow smoothly. An angle θ of greater than 50° allows the fluid to flow rapidly and strongly in the downward direction, but the flow for such an angle is excessive and results in the introduced fluid striking the sealing member 3213 more directly, thus applying vibration to the stem 3211.

As is apparent from the above description, the present invention is capable of protecting a stem from foreign substances included in high-pressure fluid that is introduced into a stop valve and of preventing the stem from being damaged by high-cycle fatigue attributable to vibration that is applied to the stem.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A valve module comprising a case enclosing a flow space into which fluid is introduced; a control valve disposed in the flow space and configured to control an amount of the fluid flowing through the flow space; and a stop valve disposed in the flow space below the control valve, the stop valve including:
   a stem configured to reciprocate rectilinearly between a first position and a second position,
   a stop valve disc mounted to an upper portion of the stem and configured to pass fluid when the stem is in the first position and to block fluid flow when the stem is in the second position, the stop valve disc including a bottom side having an inner circumference and an inward lip extending from the inner circumference at an inclination angle and terminating at a distal end, and
   a sealing member surrounding the stem and configured to prevent exposure of the stem when the stop valve disc is located at the first position, the sealing member including a protruding portion extending upward and flaring outward at the inclination angle of the inward lip, the protruding portion terminating at a distal end that meets the distal end of the inward lip when the stop valve disc is located in the first position.

2. The valve module according to claim 1, wherein the stop valve disc is disposed in an upward location according to vertical movement of the stem into the first position and is disposed in a downward location according to vertical movement of the stem into the second position.

3. The valve module according to claim 1, wherein the sealing member is formed of a material having greater toughness than a material of the stem.

4. The valve module according to claim 1, wherein the stop valve disc has a receiving recess formed in the bottom side to receive the sealing member.

5. The valve module according to claim 4, wherein the distal end of the protruding portion of the sealing member and the distal end of the inward lip of the stop valve disc engage with each other when the stop valve disc is in the first position to prevent fluid from entering the receiving recess through the bottom side of the stop valve disc.

6. The valve module according to claim 1, wherein the stop valve disc has an insertion recess formed in the bottom side to receive the protruding portion when the stem is in the second position.

7. The valve module according to claim 1, wherein the sealing member comprises a guide portion (3213b) formed at an upper end of the sealing member, the guide portion having a concavely curved shape in order to guide fluid in a downward direction when the stop valve disc is located at the first position.

8. The valve module according to claim 7, wherein, below the guide portion, the sealing member has an outer diameter that gradually increases in the downward direction.

9. The valve module according to claim 1, wherein the case comprises a valve seat on which the stop valve disc is seated in order to block a flow passage of fluid, the valve seat comprising:
   a convex portion facing the stop valve and
   an inclined surface that is flat and is inclined downwardly in order to guide fluid introduced into a fluid space formed between the valve seat and the stop valve disc, the flat inclined surface forming part of the convex portion and facing a surface formed by the inward lip of the stop valve disc and the protruding portion of the sealing member when the stop valve disc is in the first position.

10. The valve module according to claim 9, wherein the inclined surface is inclined at an angle ranging from 40° to 50° with respect to a horizontal line that extends from an upper end of the valve seat.

11. The valve module according to claim 1, wherein the flow space has an elliptical shape.

12. The valve module according to claim 1, wherein the control valve comprises:
   a rod configured to reciprocate rectilinearly in a vertical direction; and
   a control valve disc mounted to a lower portion of the rod and configured to control the fluid flow amount according to movement of the rod, the control valve disc including a lower portion for guiding the fluid in a downward direction, the control valve disc having an outer diameter of the lower portion that gradually decreases in the downward direction, and
   wherein the guided fluid flows over the outer diameter of the control valve disc to pass the stop valve disc when the stop valve disc is located at the first position.

13. The valve module according to claim 12, wherein the control valve disc has a bottom side and a receiving recess in which an upper end portion of the stop valve disc and an upper end portion of the stem are received through the bottom side.

14. The valve module according to claim 1, wherein the inward lip of the stop valve disc includes a first inclined surface having one end communicating with the distal end of the inward lip, and the protruding portion of the sealing member includes a second inclined surface having one end communicating with the distal end of the protruding portion; and wherein, when the stop valve disc is located in the first position, the first and second inclined surfaces are aligned with each other and face a flow of the fluid passing the stop valve disc.

15. The valve module according to claim 14, wherein the control valve comprises a control valve disc mounted to a rectilinearly reciprocating rod and configured to control the fluid flow amount according to movement of the rod, the control valve disc including a lower portion for guiding the fluid in a downward direction, the control valve disc having an outer diameter of the lower portion that gradually decreases in the downward direction to form a combined surface with the first and second inclined surfaces so that, when the stop valve disc is located at the first position, the fluid guided in the downward direction flows smoothly over the outer diameter of the control valve disc and the first and second inclined surfaces.

16. The valve module according to claim 14, further comprising a valve seat on which the stop valve disc is seated in order to block a flow passage of fluid, the valve seat including a flat surface that faces the stop valve and is inclined at an angle substantially parallel to the first and second inclined surfaces.

17. The valve module according to claim 1, wherein the control valve has an outer diameter over which the controlled amount of the fluid flows.

18. A steam turbine comprising a turbine including a rotor equipped with a plurality of turbine blades and a turbine housing for accommodating the rotor, the turbine housing having a fluid inlet and a fluid outlet; and a valve module mounted to the fluid inlet of the turbine, the valve module comprising a case enclosing a flow space into which fluid is introduced; a control valve disposed in the flow space and configured to control an amount of the fluid flowing through the flow space; and a stop valve disposed in the flow space below the control valve, the stop valve including:
   a stem configured to reciprocate rectilinearly between a first position and a second position,
   a stop valve disc mounted to an upper portion of the stem and configured to pass fluid when the stem is in the first position and to block fluid flow when the stem is in the second position, the stop valve disc including a bottom side having an inner circumference and an inward lip extending from the inner circumference at an inclination angle and terminating at a distal end, and
   a sealing member surrounding the stem and configured to prevent exposure of the stem when the stop valve disc is located at the first position, the sealing member including a protruding portion extending upward and flaring outward at the inclination angle of the inward lip, the protruding portion terminating at a distal end that meets the distal end of the inward lip when the stop valve disc is located in the first position.

19. A power generation system comprising:
   a boiler configured to heat fluid to a high temperature;
   a supply pipe connected to the boiler and configured to transfer fluid; and
   a steam turbine configured to be rotated by fluid supplied thereto via the supply pipe so as to generate drive force, the steam turbine including a turbine and a valve module mounted to the turbine, wherein the valve module comprises a case enclosing a flow space into which fluid is introduced; a control valve disposed in the flow space and configured to control an amount of the fluid flowing through the flow space; and a stop valve disposed in the flow space below the control valve, the stop valve including:

a stem configured to reciprocate rectilinearly between a first position and a second position, a stop valve disc mounted to an upper portion of the stem and configured to pass fluid when the stem is in the first position and to block fluid flow when the stem is in the second position, the stop valve disc including a bottom side having an inner circumference and an inward lip extending from the inner circumference at an inclination angle and terminating at a distal end, and a sealing member surrounding the stem and configured to prevent exposure of the stem when the stop valve disc is located at the first position, the sealing member including a protruding portion extending upward and flaring outward at the inclination angle of the inward lip, the protruding portion terminating at a distal end that meets the distal end of the inward lip when the stop valve disc is located in the first position.

20. The power generation system according to claim 19, further comprising a fluid circulation line configured to circulate fluid discharged from the steam turbine, the fluid circulation line comprising:

a first circulation line configured to allow fluid discharged from the steam turbine to undergo heat exchange in a recuperator;

a second circulation line configured to allow fluid that has undergone heat exchange in the recuperator to be condensed in an air-cooled condenser;

a third circulation line configured to allow fluid condensed in the air-cooled condenser to be compressed by a main pump;

a fourth circulation line configured to allow fluid compressed by the main pump to undergo heat exchange in the recuperator; and a fifth circulation line configured to allow fluid that has undergone heat exchange in the recuperator to be reheated in the boiler.

\* \* \* \* \*